(12) United States Patent
Gan et al.

(10) Patent No.: US 6,801,427 B2
(45) Date of Patent: Oct. 5, 2004

(54) DRIVE BRACKET STRUCTURE

(75) Inventors: Li Yuan Gan, Shenzhen (CH);
Guang-Yi Zhang, Shenzhen (CH);
Lu-Sheng Li, Shenzhen (CH)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 107 days.

(21) Appl. No.: 10/308,634

(22) Filed: Dec. 2, 2002

(65) Prior Publication Data

US 2004/0008482 A1 Jan. 15, 2004

(30) Foreign Application Priority Data

Jul. 10, 2002 (TW) ..................................... 091210512 U

(51) Int. Cl.⁷ ................................................ G06F 1/16
(52) U.S. Cl. ..................... 361/685; 360/137; 312/307; 312/294; 248/317; 248/229.1; 211/26; 211/190
(58) Field of Search ................................ 361/679–686; 312/223.1, 223.2, 307, 263; 248/317, 694, 299.1; 211/26, 189, 190, 150; 360/97.02, 137

(56) References Cited

U.S. PATENT DOCUMENTS 5,995,364 A  * 11/1999 McAnally et al. .......... 361/685
6,273,273 B1 *  8/2001 Liao ............................ 211/26
6,386,656 B1 *  5/2002 Chen ........................ 312/223.2
6,530,551 B2 *  3/2003 Gan ........................... 248/694
6,714,409 B2 *  3/2004 Chen .......................... 361/685
2002/0190187 A1 * 12/2002 Yuan .......................... 248/694
2003/0038566 A1 *  2/2003 Qiu .......................... 312/223.2
2003/0210520 A1 * 11/2003 Chien et al. ................ 361/685

* cited by examiner

Primary Examiner—Lisa Lea-Edmonds
(74) Attorney, Agent, or Firm—Wei Te Chung

(57) ABSTRACT

A drive bracket structure includes first and second drive brackets (20, 40), a connect panel (30), and a securing bar (50). The first drive bracket includes a bottom plate (22) having a plurality of aligned pairs of catches (223), and a side plate (23) defining a slot (21). First and second slideways (221, 222) are defined in the bottom plate. The first slideway includes two straight portions. The second slideway includes two straight portions and an intermediate arcuate portion. The connect panel is secured to the second drive bracket. A pair of screws (38) fastened on the connect panel is slidingly received in the respective first and second slideways. The combined connect panel and second drive bracket is slidingly moved until the second drive bracket is located beneath the first drive bracket. The securing bar is extended through the slot of the first drive bracket and engaged with the catches.

17 Claims, 4 Drawing Sheets

DRIVE BRACKET STRUCTURE

BACKGROUND OF THE INVENTION

1. Field of the Invention

The present invention relates to a drive bracket structure for use in equipment such as a computer enclosure, and in particular to a drive bracket structure which has a drive bracket readily attached to another drive bracket.

2. Related Art

A personal computer enclosure usually comprises first and second drive brackets for accommodating data storage devices therein. Typically, the first drive bracket is firstly secured to the computer enclosure, and the second drive bracket is subsequently fastened to a bottom of the first drive bracket. The second drive bracket is usually secured directly to the first drive bracket with screws.

Taiwan Patent Application No. 83202773 discloses a fastening means by which the second drive bracket is directly fastened to the pre-installed first drive bracket using screws. Screw holes are defined in the first drive bracket. Flanges are formed at upper portions of the second drive bracket. At least two through holes are defined in each flange. Screws fasten the second drive bracket to the first drive bracket. However, installation and removal of the second drive bracket is unduly complicated and laborious. Furthermore, when the screws are secured in the though holes and the screw holes with a tool during assembly, components of the computer are prone to be accidentally damaged.

Taiwan Patent Application No. 81205427 discloses a fastening means by which the second drive bracket is slidably fastened to the first drive bracket. The first drive bracket forms flanges at opposite sides thereof. The second drive bracket forms tabs corresponding to the flanges of the first drive bracket. In assembly, the second drive bracket is engaged with the pre-installed first drive bracket from a rear of the first drive bracket. The tabs of the second drive bracket are slid straight along the corresponding flanges of the first drive bracket until the second drive bracket is fully engaged under the first drive bracket.

To perform such installation, significant space within the enclosure rearward of the first drive bracket is required. Such space effectively adds to the size of the enclosure, making the enclosure less compact and less convenient.

Thus an improved drive bracket structure which overcomes the above-mentioned problems is desired.

SUMMARY OF THE INVENTION

Accordingly, an object of the present of invention is to provide a drive bracket structure which conveniently fastens a drive bracket in a computer enclosure with minimal risk of damage to other components in the enclosure.

Another object of the present invention is to provide a drive bracket structure which saves valuable space within a computer enclosure.

To achieve the above-mentioned objects, a drive bracket structure in accordance with a preferred embodiment of the present invention comprises first and second drive brackets, a connect panel and a securing bar. The first drive bracket comprises a bottom plate and a pair of side plates. A first slideway and a second slideway are defined in the bottom plate. The first slideway comprises two straight portions oriented perpendicular to each other. The second slideway comprises two straight portions and an intermediate arcuate portion. A plurality of aligned pairs of catches is formed on the bottom plate. A slot is defined in one of the side plates, in alignment with the pairs of catches. The connect panel is secured to the second drive bracket. A pair of screws fastened on the connect panel is slidingly received in the corresponding first and second slideways. The combined connect panel and second drive bracket is slidingly moved until the second drive bracket is located beneath the first drive bracket. The securing bar is extended through the slot of the first drive bracket and engaged with the pairs of catches. The securing bar abuts the screws and prevents the screws from moving. The second drive bracket is thereby securely fastened to the first drive bracket.

Other objects, advantages and novel features of the present invention will be drawn from the following detailed description of preferred embodiments of the present invention with attached drawings, in which:

DESCRIPTION OF THE PREFERRED EMBODIMENTS

Figure 1:
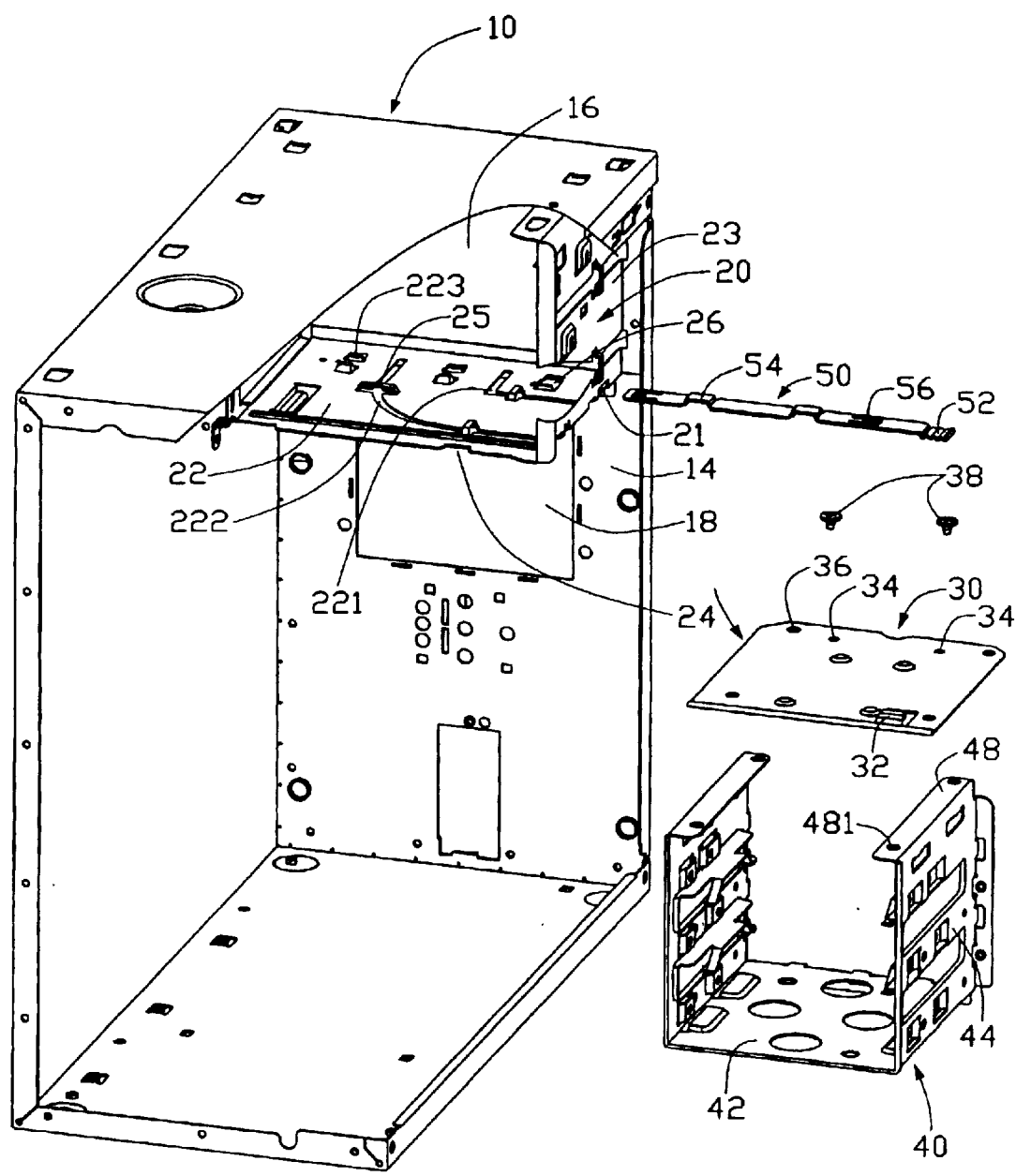
FIG. 1 is an exploded isometric view of a drive bracket structure of the present invention and a chassis, with part of the chassis cut away for clearer illustration.

Referring to FIG. 1, a drive bracket structure in accordance with a preferred embodiment of the present invention includes a first drive bracket 20, a connect panel 30, a second drive bracket 40 and a securing bar 50. All these components are secured within a chassis 10 of a computer (not shown).

The chassis 10 comprises a front panel 14. The front panel 14 defines a first opening 16 in a top portion thereof, and a second opening 18 below the first opening 16.

The first drive bracket 20 is secured to the front panel 14 at the first opening 16. The first drive bracket 20 comprises a first bottom plate 22, and a pair of first side plates 23 extending upwardly from opposite sides of the bottom plate 22 respectively. A first slideway 221 and a second slideway 222 are defined in the bottom plate 22. The first slideway 221 comprises two straight portions oriented at an angle to each other. In the preferred embodiment, the angle is a right angle. The second slideway 222 comprises two straight portions parallel to the two portions of the first slideway 221 respectively, and an intermediate arcuate portion interconnecting said two straight portions. All points along the arcuate portion are equidistant from a junction of the two straight portions of the first slideway 221. A plurality of pairs of aligned catches 223 is stamped upwardly from the bottom plate 22. Each catch 223 has an L-shaped profile. A receiving space (not labeled) is thereby defined between each pair of catches 223. At least one opening 26 is defined in the bottom plate 22 between at least one of the pairs of catches 223. A cutout 24 is defined in a rear edge of the bottom plate 22. A plurality of reinforcing ribs 25 are formed on the bottom plate 22 across the first and second slideways 221, 222. One of the first side plates 23 defines a slot 21 in alignment with the pairs of catches 223.

The connect panel 30 is generally rectangular. A pair of screw holes 34 is defined in the connect panel 30 adjacent one side thereof, corresponding to open ends of the first and second slideways 221, 222 respectively of the first drive bracket 20. A pair of sliding members 38 corresponds to the screw holes 34. In the preferred embodiment, the sliding members 38 are screws 38. An L-shaped tab 32 is stamped upwardly from an opposite side edge of the connect panel 30, corresponding to the cutout 24 of the first drive bracket 20. Four locating holes 36 are respectively defined in four corners of the connect panel 30.

The second drive bracket 40 comprises a second bottom plate 42, and a pair of second side plates 44 extending upwardly from opposite sides of the second bottom plate 42 respectively. A flange 48 extends horizontally inwardly from an upper edge of each side plate 44. A pair of spaced bores 481 is defined in each flange 48, corresponding to the locating holes 36 of the connect panel 30.

The securing bar 50 comprises an operation portion 52 at one end thereof, two spaced protrusions 54 protruding upwardly and corresponding to inmost ends of the slideways 221, 222 respectively, and a plurality of spaced resilient fingers 56 bent slightly downwardly.

Figure 2:
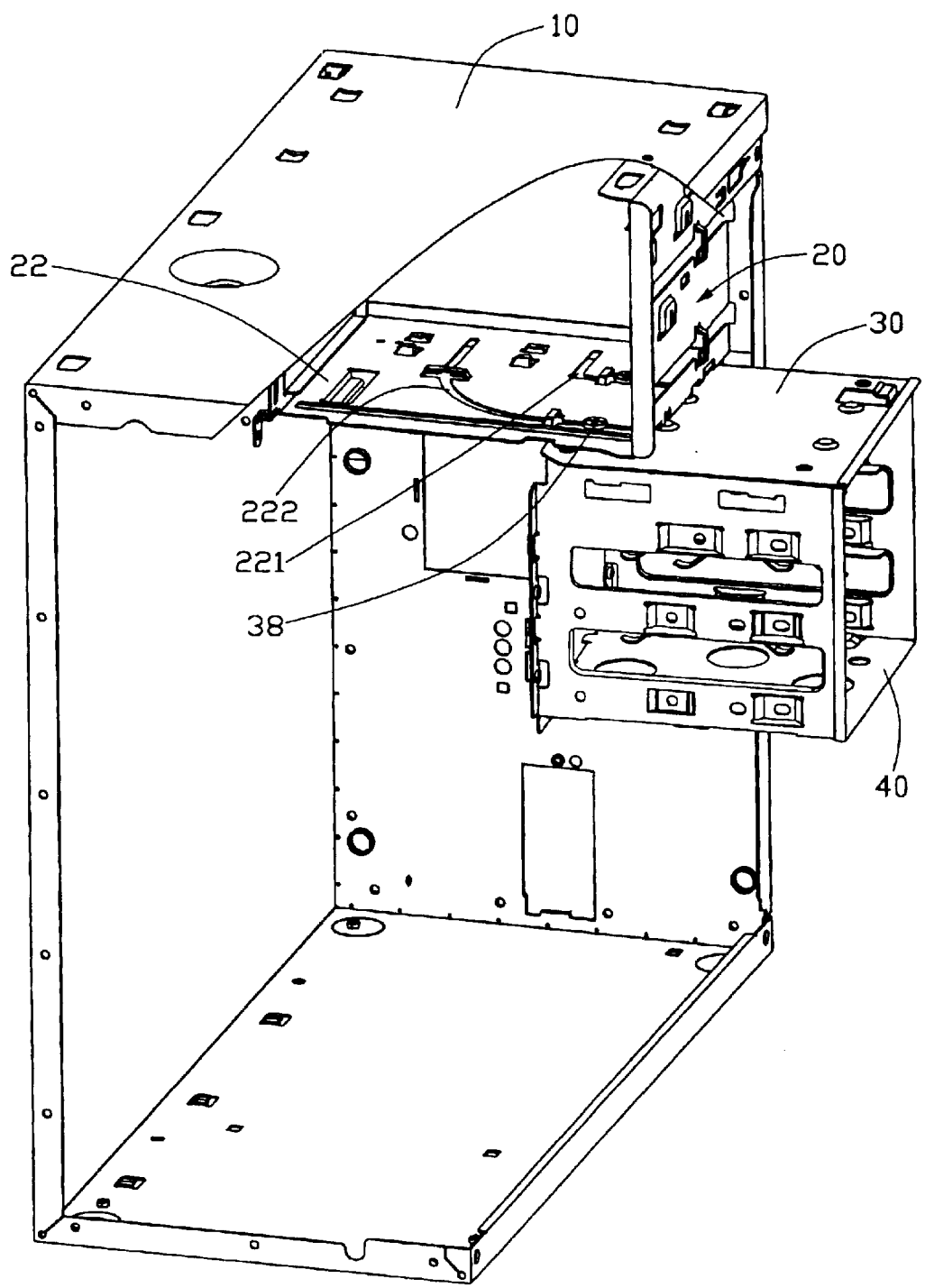
FIG. 2 is a partly assembled view of FIG. 1.
Figure 3:
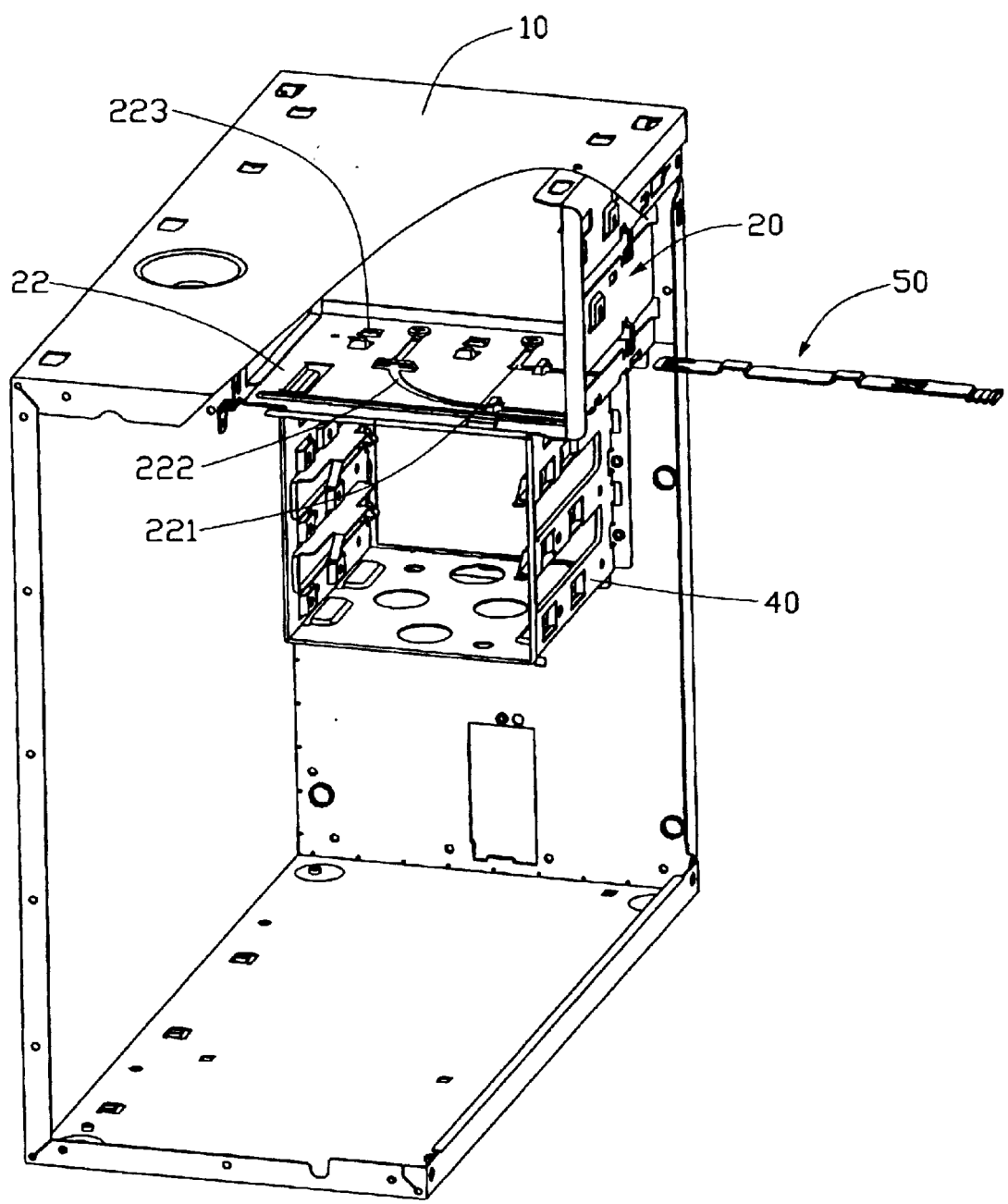
FIG. 3 is a more fully assembled view of FIG. 1.
Figure 4:
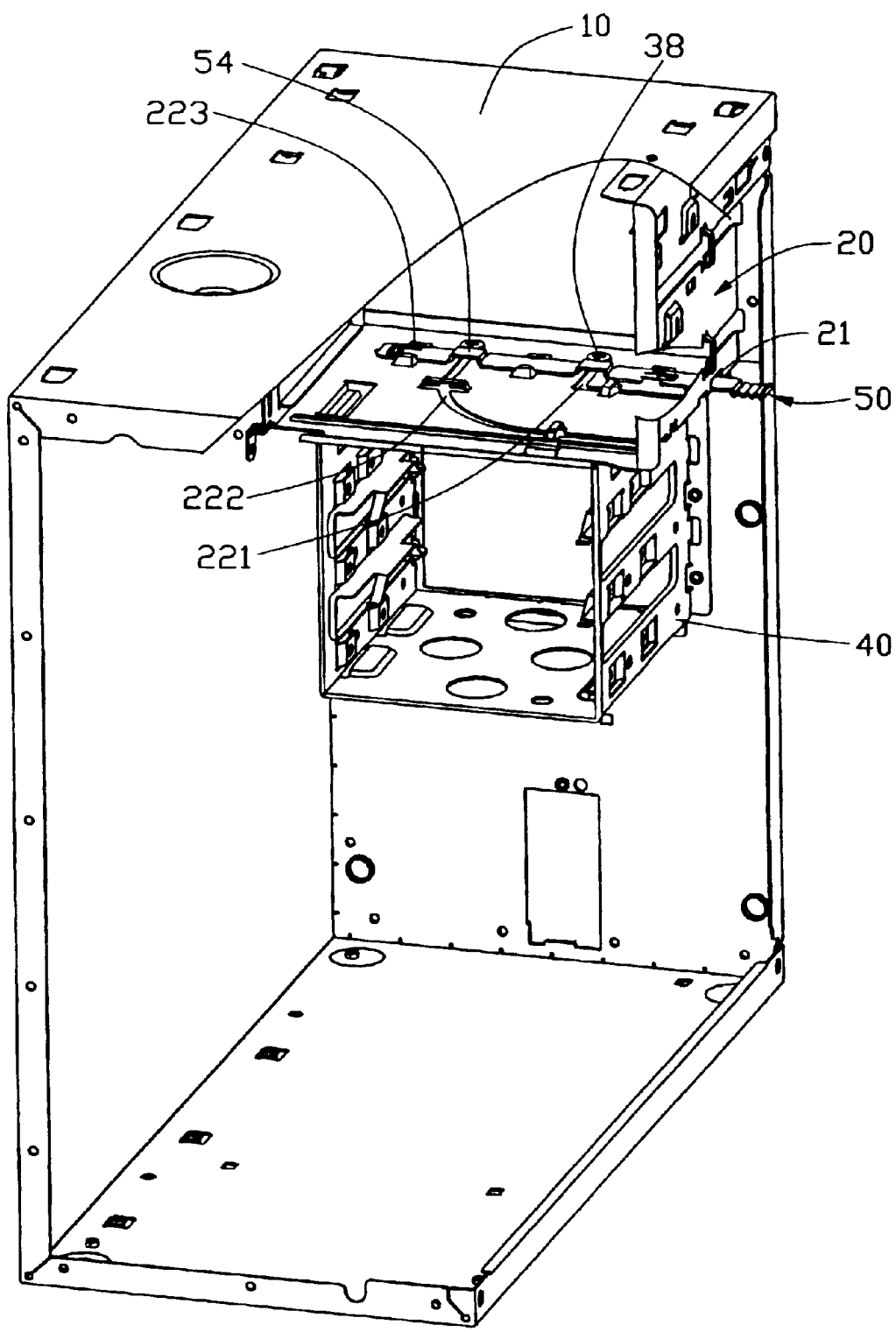
FIG. 4 is a fully assembled view of FIG. 1.

Referring also to FIGS. 2–4, in pre-assembly, the connect panel 30 is placed on the second drive bracket 40. The locating holes 36 of the connect panel 30 are aligned with the bores 481 of the second drive bracket 40. Rivets are extended through the locating holes 36 and bores 481 to secure the connect panel 30 to the second drive bracket 40. The screws 38 are respectively engaged in the screw holes 34.

In assembly, the first drive bracket 20 is placed against a rear face of the front panel 14 at the first opening 16. The first drive bracket 20 is secured to the front panel 14 and within the chassis 10 by conventional means. The combined connect panel 30 and second drive bracket 40 is inserted into the chassis 10 from a side thereof. The screws 38 of the connect panel 30 are slidingly received in the corresponding first and second slideways 221, 222. At first, the screws 38 are slid straight along outmost straight portions of the first and second slideways 221, 222. When the screw 38 in the first slideway 221 reaches the junction of the two straight portions of the first slideway 222, said screw 38 stops sliding and the screw 38 in the second slideway 222 slides along the arcuate portion of the second slideway 222. Thus, the combined connect panel 30 and second drive bracket 40 rotates about the junction of the two straight portions of the first slideway 221 until the second side plates 44 of the second drive bracket 40 are parallel to the first side plates 23 of the first drive bracket 20. Thereupon, the screws 38 are slid straight along inmost straight portions of the first and second slideways 221, 222 until the combined connect panel 30 and second drive bracket 40 abuts the front panel 14 at the second opening 18. The screws 38 are engaged in inmost ends of the first and second slideways 221, 222. At the same time, the tab 32 of the connect panel 30 engages with the first bottom plate 22 of the first drive bracket 20 at the cutout 24.

Then, the securing bar 50 is inserted through the slot 21 of the first drive bracket 20 and through the receiving spaces defined between the pairs of catches 223. The protrusions 54 of the securing bar 50 abut the screws 38 at the inmost ends of the first and second slideways 221, 222 respectively, thereby preventing the screws 38 from moving backward. At the same time, the resilient fingers 56 resiliently press against the bottom plate 22 of the first drive bracket 20, thereby firmly securing the securing bar 50 to the first drive bracket 20. One of the resilient fingers 56 engages in the opening 26 of the bottom plate 22, thereby preventing the securing bar 50 from being inadvertently withdrawn from the first drive bracket 20.

When a disk drive that is retained in the second drive bracket 40 needs to be maintained or replaced, the securing bar 50 is withdrawn from the first drive bracket 20. The combined connect panel 30 and second drive bracket 40 is then rotated out from the chassis 10. This procedure is quick and convenient.

In an alternative embodiment of the present invention, the two straight portions of the first slideway 221 may be interconnected by an intermediate arcuate portion. If so, all points along an arcuate portion of the second slideway 222 are substantially equidistant from corresponding points along said intermediate arcuate portion of the first slideway 221.

In a further alternative embodiment of the present invention, the flanges 48 of the second drive bracket 40 may extend horizontally inwardly from the upper edges of the side plates 44 such that the screw holes 34 can be defined directly in the flanges 48, and the L-shaped tab 32 can be stamped upwardly directly from an edge of one of the flanges 48. In such case, the connecting panel 30 is not needed.

It is understood that the invention may be embodied in still other forms without departing from the spirit thereof. Thus, the present examples and embodiments are to be considered in all respects as illustrative and not restrictive, and the invention is not to be limited to the details given herein.

What is claimed is:

1. A drive bracket structure comprising:
   a first drive bracket comprising a first bottom plate, and a first slideway and a second slideway defined in the first bottom plate;
   a connect panel having a pair of sliding members;
   a second drive bracket attached below the connect panel and comprising a second bottom plate and a pair of second side plates extending upwardly from opposite sides of the second bottom plate; and
   a securing bar extending into the first drive bracket;
   wherein when the sliding members are slid along the first and second slideways, the combined connect panel and second drive bracket is rotatingly received below the first drive bracket, and the securing bar can be engaged with the sliding members thereby securing the second drive bracket to the first drive bracket.

2. The drive bracket structure as described in claim 1, wherein the first slideway comprises two straight portions, and the second slideway comprises two straight portions respectively parallel to the straight portions of the first slideway, the straight portions of the second slideway are interconnected by an arcuate portion, and all points along the arcuate portion are substantially equidistant from a junction of the straight portions of the first slideway.

3. The drive bracket structure as described in claim 1, wherein the first slideway comprises two straight portions interconnected by an arcuate portion, the second slideway comprises two straight portions interconnected by an arcuate portion, the straight portions of the second slideway are respectively parallel to the straight portions of the first slideway, and all points along the arcuate portion of the second slideway are substantially equidistant from corresponding points along the arcuate portion of the first slideway.

4. The drive bracket structure as described in claim 1, wherein the first bottom plate further comprises a plurality of aligned pairs of catches arranged thereon, and the first drive bracket further comprises a first side plate defining a slot aligned with the pairs of catches, and the securing bar extends through the slot to locate between corresponding pairs of catches.

5. The drive bracket structure as described in claim 4, wherein at least one opening is defined in the first bottom plate between at least one of the pairs of catches, and the securing bar comprises at least one resilient finger engaging in the at least one opening.

6. The drive bracket structure as described in claim 1, wherein the securing bar comprises an operation portion at an outer end thereof, and at least one protrusion abutting at least one of the sliding members for preventing the at least one of the sliding members from moving out of position.

7. The drive bracket structure as described in claim 1, wherein a cutout is defined in one edge of the first bottom plate, a tab is arranged at one edge of the connect panel, and the tab engages with first bottom plate at the cutout.

8. The drive bracket structure as described in claim 1, wherein a plurality of reinforcing ribs is formed on the first bottom plate across the first and second slideways.

9. The drive bracket structure as described in claim 1, wherein four locating holes are respectively defined in four corners of the connect panel, the second drive bracket further comprises a pair of flanges arranged inwardly from upper portions of the second side plates, and a pair of bores is defined in each of the flanges corresponding to the locating holes of the connect panel.

10. A drive bracket assembly comprising:
   a chassis having a front panel defining a first opening and a second opening;
   a first drive bracket attached to the front panel at the first opening, the first drive bracket comprising a first bottom plate and a pair of first side plates extending upwardly from opposite sides of the bottom plate, the first bottom plate defining a first slideway having two straight portions, and a second slideway having two straight portions interconnected by an arcuate portion, a plurality of aligned catches being arranged on the bottom plate, the side plate defining a slot aligned with the catches;
   a second drive bracket comprising a second bottom plate, a pair of second side plates extending upwardly from opposite sides of the second bottom plate, a pair of flanges arranged inwardly from upper portions of the second side plates, and a pair sliding members arranged on the flanges; and
   a securing bar extending through the slot into the first drive bracket and movably retained by the catches;
   wherein the sliding members are slid along the first and second slideways to rotate the second drive bracket below the first drive bracket, the securing bar is engaged with the sliding members thereby securing the second drive bracket to the first drive bracket.

11. The drive bracket structure as described in claim 10, wherein the straight portions of the first slideway are respectively parallel to the straight portions of the second slideway, and all points along the arcuate portion of the second slideway are substantially equidistant from a junction of the straight portions of the first slideway.

12. The drive bracket structure as described in claim 10, wherein the first slideway comprises two straight portions interconnected by an arcuate portion, the straight portions of the second slideway are respectively parallel to the straight portions of the first slideway, and all points along the arcuate portion of the second slideway are substantially equidistant from corresponding points along the arcuate portion of the first slideway.

13. The drive bracket structure as described in claim 10, wherein the securing bar comprises an operation portion at an outer end thereof, a protrusion protruding in a first direction, and at least one resilient finger bent slightly in an opposite second direction, and at least one opening is defined in the first bottom plate for engagingly receiving the at least one resilient finger.

14. A method for assembling a drive bracket assembly, the method comprising the steps of;
   providing a chassis having a front panel;
   securing a first drive bracket to the front panel within the chassis, the first drive bracket having a bottom plate, the bottom plate defining a first slideway having two straight portions and a second slideway having two straight portions interconnected by an arcuate portion;
   providing a second drive bracket comprising a pair of sliding members, and sliding the sliding members into outmost portions of the respective first and second slideways;
   pushing the second drive bracket in a first direction parallel to the front panel such that the sliding members slide along corresponding straight portions parallel to the front panel;
   rotating the second drive bracket 90 degrees by sliding one of the sliding members in the second slideway along the arcuate portion;
   pushing the second drive bracket toward the front panel in a second direction perpendicular to the front panel such that the sliding members slide along corresponding straight portions perpendicular to the front panel; and
   extending a securing bar into the first drive bracket, the securing bar engaging with the sliding members thereby securing the second drive bracket below the first drive bracket in the chassis.

15. A drive bracket structure comprising:
   a first drive bracket including a bottom plate with a pair of curved slideways therein, innermost ends of said slideways directing to a first direction while outermost ends of said slideways directing to a second direction perpendicular to said first direction; and
   a second drive bracket with a connection plate at a top portion including means for being suspended under the bottom plate and being slidable along said pair of curved slideways between said outermost ends where the second drive bracket is assembled to or disassembled from the first drive bracket, and said innermost ends where the second drive bracket is in a fixed position with the first drive bracket.

16. The structure as described in claim 15, further including a securing bar assembled to at least one of said first drive bracket and said second drive bracket to prevent said means from backwardly moving along said pair of slideways.

17. The structure as described in claim 16, wherein said securing bar is moveable along the second direction.

* * * * *